Oct. 14, 1924.
G. H. DAWSON
INDEX TAB
Filed Feb. 21, 1923    2 Sheets—Sheet 1
1,511,268
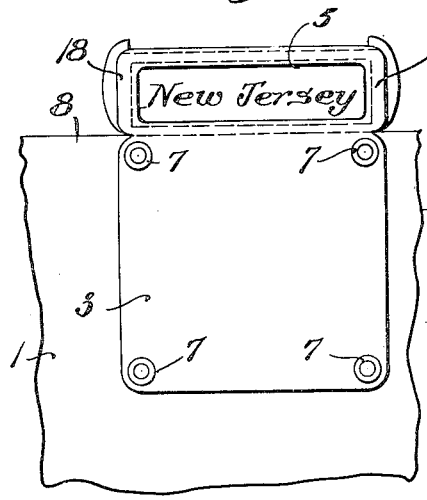
Fig.1
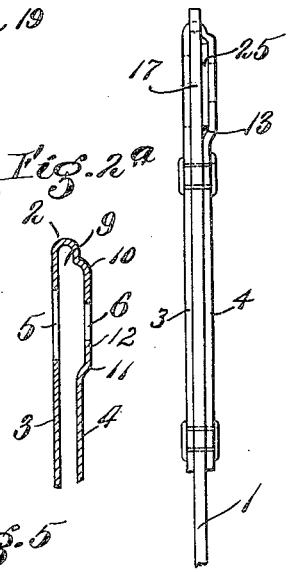
Fig.2  Fig.2ª
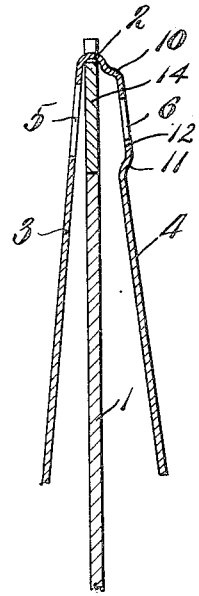
Fig.3
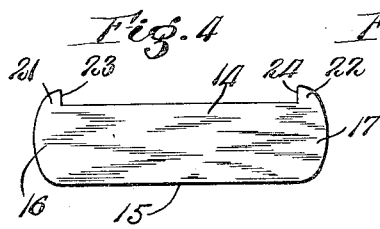
Fig.4
Fig.5
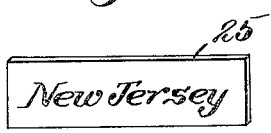
Fig.6
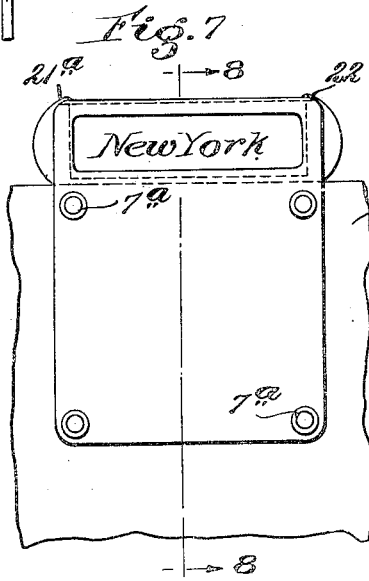
Fig.7
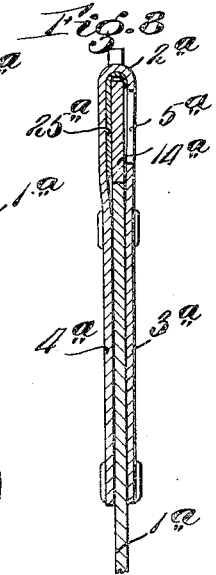
Fig.8
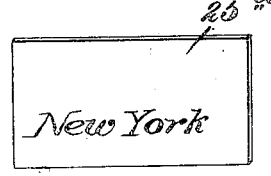
Fig.9
Inventor:
George H. Dawson,
by Roberts, Roberts & Cushman,
Attys.

Oct. 14, 1924.
G. H. DAWSON
INDEX TAB
1,511,268
Filed Feb. 21, 1923     2 Sheets—Sheet 2
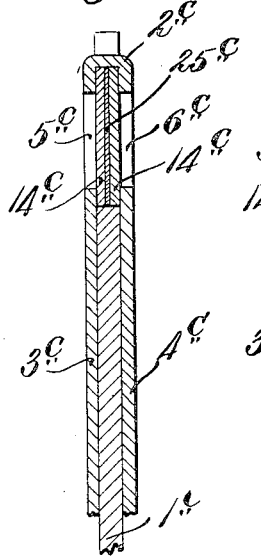
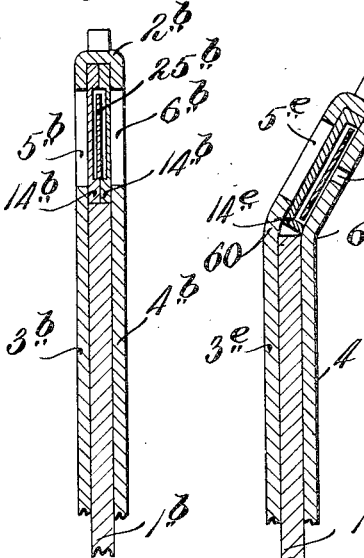
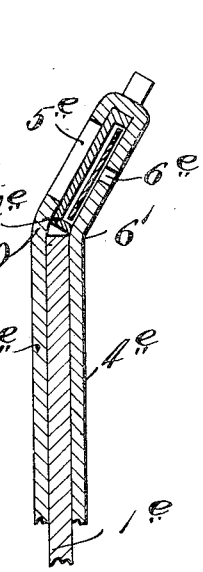
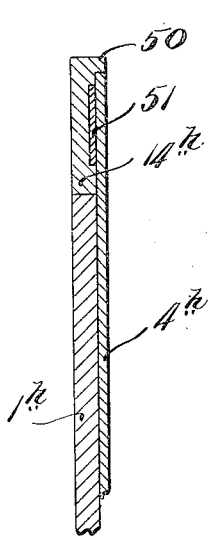
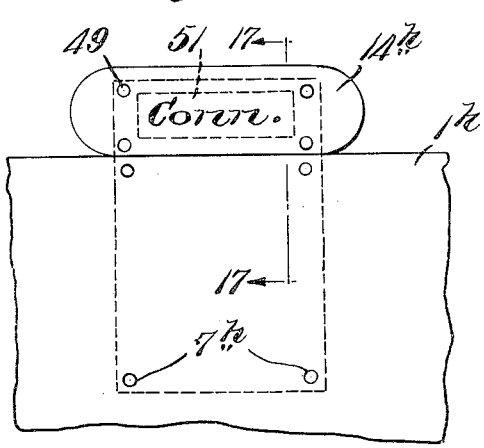
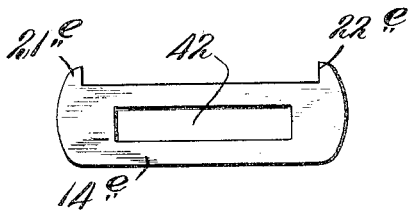
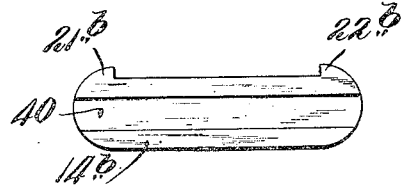
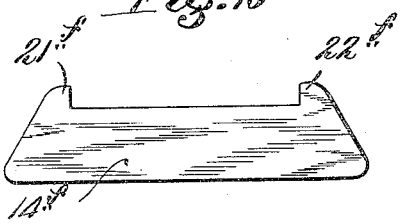
Inventor:
George H. Dawson,
by Roberts, Roberts & Cushman,
Attys.

Patented Oct. 14, 1924.

1,511,268

UNITED STATES PATENT OFFICE.

GEORGE H. DAWSON, OF BOSTON, MASSACHUSETTS, ASSIGNOR TO LIBRARY BUREAU, OF CAMBRIDGE, MASSACHUSETTS, A CORPORATION OF NEW JERSEY.

INDEX TAB.

Application filed February 21, 1923. Serial No. 620,393.

*To all whom it may concern:*

Be it known that I, GEORGE H. DAWSON, a citizen of the United States of America, and resident of Boston, in the county of Suffolk and State of Massachusetts, have invented new and useful Improvements in Index Tabs, of which the following is a specification.

This invention pertains to index cards and particularly to improvements in index tabs for guide cards of the kind commonly employed in filing systems.

In the accompanying drawings which illustrate preferred forms of the invention:

Fig. 1 is a fragmentary front elevation of a guide card provided with a tab embodying the present improvements;

Fig. 2 is an edge elevation of the card of Fig. 1;

Fig. 2ª is a fragmentary vertical section of the metallic portion of said tab device before its application to the guide card;

Fig. 3 is a fragmentary vertical section through such a card illustrating the mode of applying the improved tab thereto;

Fig. 4 is a front elevation and Fig. 5 an end elevation of a guard device forming a feature of the present invention;

Fig. 6 is a front elevation of an index slip employed in the improved tab;

Fig. 7 is a fragmentary front elevation of a guide card provided with a modified form of tab;

Fig. 8 is a vertical cross-section on the line 8—8 of Fig. 7;

Fig. 9 is a front elevation of an index slip for use with the tab shown in Figs. 7 and 8;

Fig. 10 is a vertical section through a guide card and tab showing another modification;

Fig. 11 is a similar view showing a further modification;

Fig. 12 is a rear elevation of a guard employed in the construction shown in Fig. 13.

Fig. 13 is a vertical section of a guide card provided with a tab of further modified form;

Fig. 14 is a rear elevation of a modified type of guard useful for example in the construction shown in Fig. 11;

Fig. 15 is a front elevation of a further modified form of guard;

Fig. 16 is a fragmentary front elevation of a guide card having a tab and guard of further modified form; and Fig. 17 is a vertical section on the line 17—17 of Fig. 16.

As the tabs of guide cards are commonly employed as handles for manipulating the cards they should be strong and of more durable construction than the body of the card but free from sharp edges or corners which might injure the fingers of the user, while the distinguishing characteristics or symbols employed should be adequately protected from dirt and defacement, preferably removable, and for certain purposes visible from either side of the card.

The tab herein illustrated is adapted for attachment to the edge of an index sheet or other element, such for example as a guide card and hereinafter referred to generically as a "card," formed of any proper material as bristol board, fiber board or the like, and comprises in general a guard device formed from stiff sheet material, preferably transparent, as for example celluloid, and of a thickness substantially equal to that of the card and arranged in edge to edge relation to the latter, an index slip, label or equivalent device having suitable symbols, indicia or distinguishing characteristics visible from one or both sides, and a metallic reinforcing and supporting element permanently attached to the card and serving as a securing means for holding the guard member and index element in assembled relation to the card.

By the improvements herein illustrated the exposed surface of the index slip is adequately protected from defacement by a relatively thick, stiff sheet of transparent material and the edges and corners of the metal strip, where they project above the upper edge of the card are so guarded as substantially to prevent contact of the user's fingers therewith while the stiffness of the guard plate is such as to resist any bending or distorting of the projecting portion of the metallic supporting strip.

Referring to Figs. 1 to 3 inclusive the upper portion of a guide card 1 of usual form is shown having a tab constructed in accordance with the present invention secured thereto. This tab preferably comprises a guard 14 made of celluloid, or other suitable transparent sheet material and of a thickness substantially equal to that of the card. This guard has a substantially straight lower edge 15 adapted to rest upon the upper edge 8 of the card 1. The ends 16, 17 of the guard are smoothly rounded and terminate in upstanding lugs 21, 22, respectively, whose inner edges are defined by the vertical surfaces 23, 24. The guard is secured to the edge of the card by a reinforcing and supporting device comprising a strip of sheet metal or other suitable sheet material doubled at 2 to provide front and rear leaves or plates 3, 4, respectively. The front leaf or plate is provided with a window or aperture 5 for exposing the index slip hereinafter described while the rear plate 4 may be provided with a window or aperture 6 of the same size as the window 5 if desired, but ordinarily somewhat smaller such rear window being intended primarily to facilitate the removal of the index slip with or without the assistance of a pointed implement. The fold 2 of the metal strip bears on the upper edge of guard 14 between the shoulders 23, 24.

The metal of the rear leaf or plate 4 is bent rearwardly along parallel lines 10 and 11, Fig. 3, to form an offset part 12 thus providing a recess or channel 13 upon the inner side of the plate adjacent to the space 9 occupied by the guard 14. The guard device 14 is of such a length that its ends project beyond the opposite ends of the metallic reinforcing strip with its shoulders 23, 24 constituting stops to prevent its accidental displacement, while the rounded end surfaces of the lugs 21, 22 act as guard elements to cover the corners of the metal at the ends of the fold line.

Rivets or other suitable fastening devices indicated at 7 are employed for securing the parts in assembled relation. The guard 14 is of such a thickness that it snugly fills the space 9 when the parts are assembled, but the recess 13 provides a channel for the reception of an index slip such as 25, shown in Fig. 6 of any desired material such for example as bristol board, celluloid or the like, and which may be slipped into the recess 13 from one end of the tab. When thus positioned the distinguishing characteristics of the slip are visible through the transparent guard 14 at the window 5 and as the guard is in front of the slip the latter is protected from dirt or injury. To remove the slip, a pointed implement may be inserted through the window 6 and the slip removed by sliding it endwise from out the recess 13.

In Figs. 7, 8 and 9 the guide card is designated 1ª. The reinforce device in this case comprises a strip of sheet metal folded at 2ª to provide the front and rear leaves or plates 3ª, 4ª respectively lying upon opposite sides of the card and having the guard 14ª arranged between them as in the previous instance. The guard is provided with upstanding ears 21ª, 22ª which in this instance are illustrated as projecting but slightly above the metal of the tab at the fold. The front leaf or plate 3ª is provided with a window 5ª in the same manner as the tab above described. In this instance, however, the tab is not provided with a slip receiving recess and the metal of the tab closely embraces the guard 14ª. The index slip 25ª Fig. 9, is formed of relatively thin material such as paper, and in assembling the parts the slip is placed upon the rear side of the guard before the latter is inserted in the fold in the tab. After the guard with its slip has been positioned within the fold, the card 1ª is inserted between the leaves or plates 3ª and 4ª and the parts are connected by means of rivets or other fastening devices 7ª. With this arrangement the index slip is nor removable or capable of being changed.

Referring to Fig. 10, a modified construction is illustrated in which the guide card 1° is provided with a tab comprising a strip of metal folded at 2° to provide the front and rear leaves or plates 3°, 4°, respectively disposed at opposite sides of the card in the manner above described. The front plate is provided with a window 5° and the rear plate with a window 6° preferably of substantially the same size. In this case, instead of a single guard of a thickness sufficient to fill the space within the fold of the metal strip, complemental guard members 14° of substantially half the thickness of that previously described are employed and between these two guard members an index slip or label 25° is positioned. This slip or label will preferably be of paper or similar thin material and is placed between the guard elements before the parts are assembled, thus forming a permanent label or index. This index slip or label may be provided with inscriptions upon opposite sides which will be visible through the windows 5°, 6°, respectively, it being evident that the slip is protected on both sides by the guard members 14° which are preferably made of stiff and transparent celluloid or similar material. In this case as in the preceding arrangements the composite guard comprising the members 14° extends beyond the lateral edges of the metallic portion of the tab to prevent contact of the user's fingers with the edges and corners of the metal.

In Figs. 11 and 14 a further modification is shown in which the guide card 1ᵇ is furnished with a tab comprising a metal strip folded at 2ᵇ to provide the front and rear leaves or plates 3ᵇ, 4ᵇ. These leaves or plates are provided with windows 5ᵇ, 6ᵇ respectively. In this instance, as in that just previously described, the guard comprises two like members 14$^b$, but these members, as shown in Fig. 14, are furnished with elongate channels 40 in their meeting faces, which collectively provide an open ended pocket for the reception of an index slip 25$^b$. This slip may be provided with inscriptions upon opposite faces if desired, the guard members being formed of transparent material so as to render the inscriptions visible through the windows. The pocket or channel being open at both ends, permits the insertion and removal of the slip after the parts have been assembled. As in preceding example the guard members 14$^b$ are furnished with upstanding ears 21$^b$, 22$^b$, which engage the metal strip at the ends of the fold and retain the parts in assembled position. These ears need not project to an amount substantially greater than the thickness of the metal, if preferred, thus giving a more finished appearance to the upper edge of the tab.

In Figs. 12 and 13 a further modification is shown in which the guide card 1$^e$ is provided with a tab comprising a metal strip bent at 2$^e$ to provide front and rear leaves or plates 3$^e$, 4$^e$ respectively. In this instance the front leaf and rear leaf are again bent at the points 60, 61 respectively so that the upper part of the tab lies in a plane inclined to that of the guide card. The upper portion of the front leaf or plate is provided with a window 5$^e$ and the upper part of the rear leaf or plate may be provided with a narrow opening 6$^e$ to facilitate the removal of the label. A convenient form of guard is shown in Fig. 12 as consisting of a thick and stiff strip of celluloid or other suitable transparent material 14$^e$ which fits snugly within the fold of the metal and is provided with ears 21$^e$, 22$^e$ for retaining it in position. This guard is provided at its rear side with a recess 42 for the reception of the index slip indicated at 25$^e$, Fig. 13. The slip is placed in the recess during the assembling of the parts and is not removable, but is visible through the substance of the guard and through the window 5$^e$.

In Fig. 15 a modified type of guard is shown consisting of a piece of suitable material such as celluloid, bakelite, redmanol, porcelain or the like provided with positioning ears 21$^f$, 22$^f$ respectively engageable with the opposite edges of the metallic portion of the tab and having suitable indicia permanently fixed thereon, such indicia consisting of raised or depressed characters, printing, or merely a suitable distinguishing pigmentation of the material of the guard. As in the previous instance, this guard is of substantial thickness and projects beyond the lateral edges and corners of the metal to prevent such contact at the user's fingers with the latter.

In Figs. 16 and 17 the guide card 1$^h$ is illustrated as provided with a tab comprising a straight piece of metal 4$^h$ secured to the rear side of the card by means of rivets 7$^h$ or other desired attaching elements. The guard 14$^h$ in this instance is not provided with the projecting ears or lugs disclosed in the previous modifications but is secured directly to the upstanding portion of the metal strip 4$^h$ by means of rivets 49. The ends of the guard project beyond the corners and lateral edges of the metal strip as in the preceding examples. Preferably the guard is of a thickness substantially equalling or greater than the combined thickness of the card and metal strip and its rear surface is recessed to receive the projecting portion 48 of the metal strip, the edges of which are completely housed in and covered by the material of the guard as indicated at 50 in Fig. 17. This guard if of transparent material, may have an index slip 51 interposed between its rear face and the front face of the projecting portion 48 of the metal strip, or if desired, indicia may be formed directly in or upon its forward face. It is also evident that as in any of the above cases, where transparent material is employed for the guard, the desired distinguishing indicia or characteristics may be molded or embedded within the substance of such guard.

While various forms of guard have been herein shown, they are regarded as substantial equivalents one of the other and may be interchanged in any of the above constructions where it is desirable to do so.

I claim:

1. An index device having a metallic tab holder projecting therefrom and an associated non-metallic guard projecting beyond the holder.

2. An index comprising a tab holder having corners projecting beyond the margin of the index and rounded guards at said corners.

3. An index device having a tab holder positioned to one side thereof and projecting beyond a margin thereof, and a guard disposed in the plane of the device and extending beyond the projecting portion of the holder.

4. An index comprising a metallic tab holder having corners projecting beyond the margin of the index, and a non-metallic guard having rounded corners projecting beyond the corners of the tab holder.

5. A tab for index cards comprising a piece of sheet metal secured to the card and having a part projecting beyond the edge of the card, the projecting part being adapted to support an index element, and means for guarding the corners of the projecting portion of the metal piece.

6. A tab for index cards comprising a piece of stiff non-metallic material of a thickness substantially equal to that of the card and having spaced abutment elements, and a sheet metal reinforcing element engaging aligned faces of the card and the piece of material, respectively, said sheet metal element being positioned between the said spaced abutments and permanently holding said piece of material in edge to edge relation to the card.

7. A tab for index cards comprising a transparent guard of sheet material and of a thickness substantially equal to that of the index card and having inherent stiffness and rigidity, and a sheet metal reinforce device secured to the card, and means including spaced abutment members carried by the guard for permanently retaining the latter in edge to edge relation to the card.

8. A tab for index cards comprising a piece of transparent sheet celluloid of a thickness substantially equal to that of the card and independent of the latter, a strip of sheet metal doubled to provide a pocket for permanently holding said piece of material in edge to edge relation to the card, means for securing the opposed folds of said strip of metal to opposite faces of the card and means to prevent endwise movement of the celluloid piece relatively to the pocket comprising enlargements at either end of said celluloid piece.

9. A tab for index guide cards consisting of a doubled piece of sheet material secured to opposite sides of the guide card with its folded portion projecting beyond the edge of the guide card to provide an index receiving pocket, and a guard for the lateral edges of the material forming the pocket.

10. A tab for index cards comprising a doubled piece of sheet material permanently secured to opposite sides of the card with its folded portion projecting beyond the edge of the card to provide an open ended pocket, and a stiff transparent guard fitting snugly within the pocket, the piece of sheet material and the guard being provided with cooperating engaging elements for positively preventing longitudinal movement of the guard in the pocket.

11. A guard for use with an index tab consisting of a folded piece of sheet metal providing a pocket within its fold, comprising an elongate guard of transparent celluloid adapted to fit within the pocket with its ends projecting beyond the ends of the latter, the projecting ends of said guard being curved and terminating in lugs overlapping the opposite edges of the metal at the fold line.

12. A tab for index cards comprising a doubled piece of sheet material permanently secured to the card with its folded portion spaced from the edge of the card to provide a pocket, the front wall of the pocket having a window therein, a transparent member within the pocket, said member having enlarged extremities engaging the opposite ends respectively of the pocket to prevent its removal from the latter, said member extending across the window, and an index element to the rear of the front face of the transparent member and visible through the window.

13. A tab for index cards comprising a piece of sheet material provided with a part for attachment to the card and a part providing an open ended pocket having a window in its front wall, a strip of transparent celluloid within the pocket and extending beyond the ends thereof, the extremities of said strip being widened to prevent withdrawal of the strip from the pocket, and an index slip behind the celluloid strip and visible through the window.

14. A tab for index cards comprising a piece of sheet material provided with a part for attachment to the card and a part providing an open ended pocket having a window in its front wall, a strip of stiff transparent material within the pocket, said member having elements at its opposite ends engaging the opposite ends respectively of the pocket to prevent its removal from the latter, and an index slip arranged in a recess behind the transparent strip and visible through the latter.

15. A tab for index cards comprising a doubled piece of sheet metal secured to the opposite sides of the card with its folded portion spaced from the card, the front wall of the folded portion having a window opening and the rear wall having an offset providing an open ended recess, a sheet of stiff transparent material within the fold of the sheet metal above the edge of the card said sheet having an upstanding ear at either end engaging the opposite edges of the pocket respectively to prevent its removal from the latter, and an index slip removably positioned within the recess behind the sheet of transparent material.

Signed by me at Boston, this 19th day of February, 1923.

GEORGE H. DAWSON.